March 31, 1953 — A. W. DUNCAN — 2,633,230
SCRAPER CHAIN CONVEYER
Filed Nov. 9, 1950 — 3 Sheets-Sheet 1
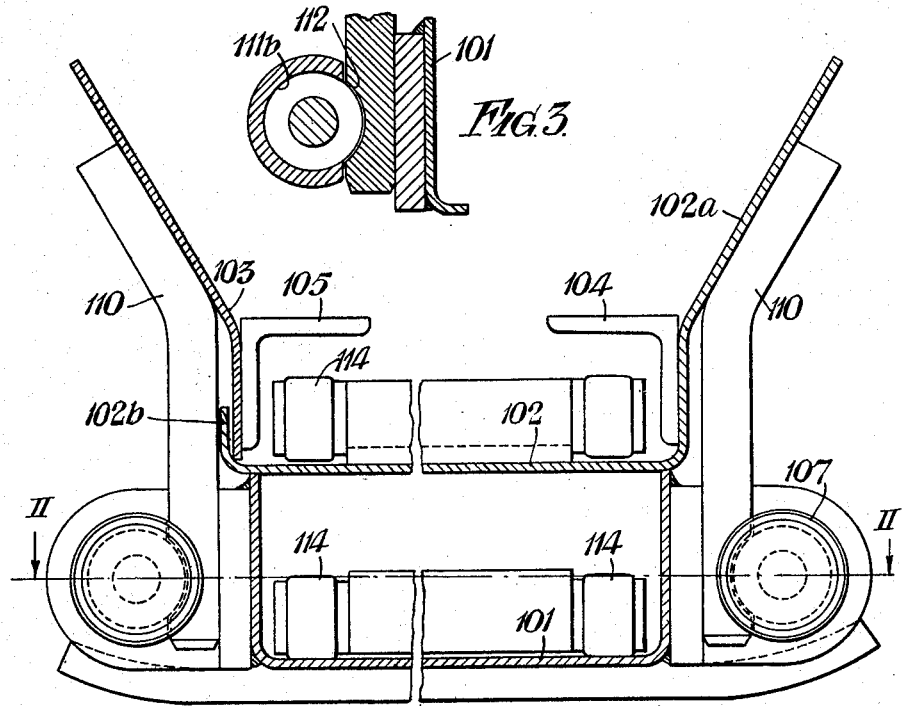
Fig. 3.
Fig. 1.
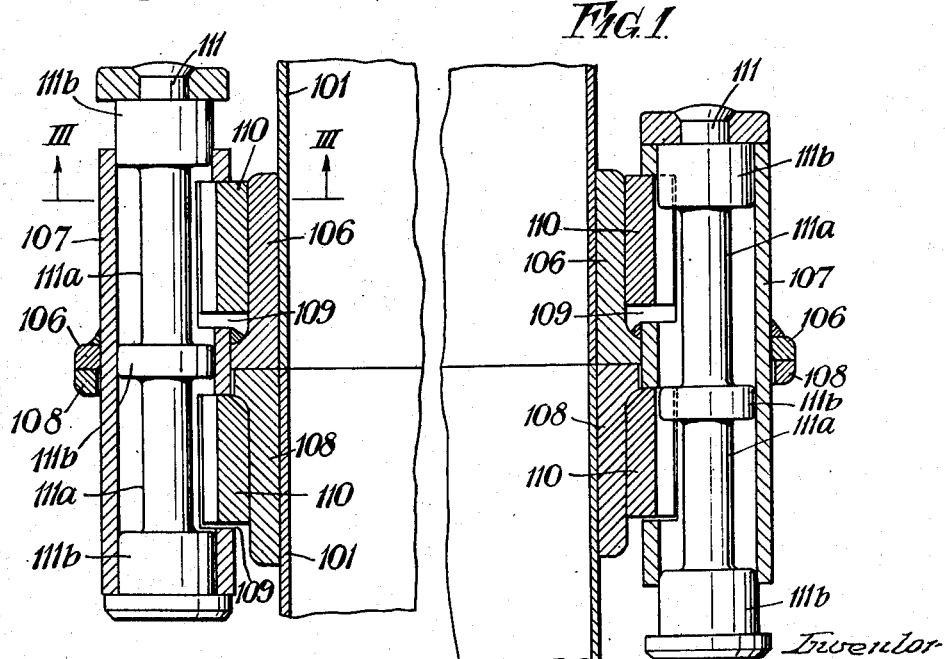
Fig. 2.
Inventor
Angus W. Duncan
By [signature]
Atty.

March 31, 1953 A. W. DUNCAN 2,633,230
SCRAPER CHAIN CONVEYER
Filed Nov. 9, 1950 3 Sheets-Sheet 2
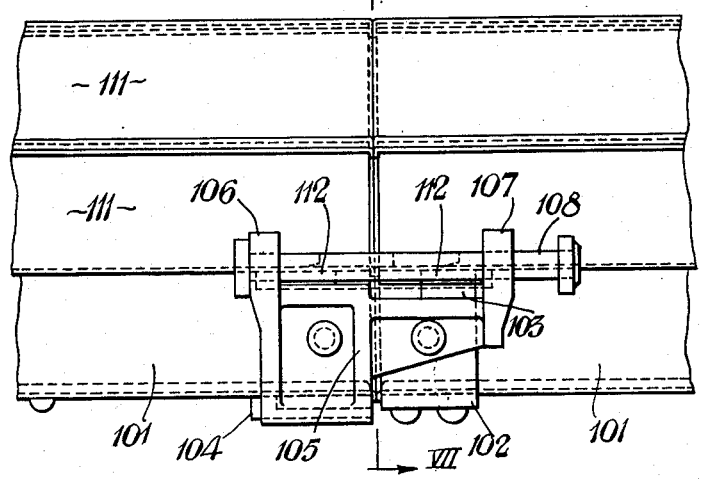
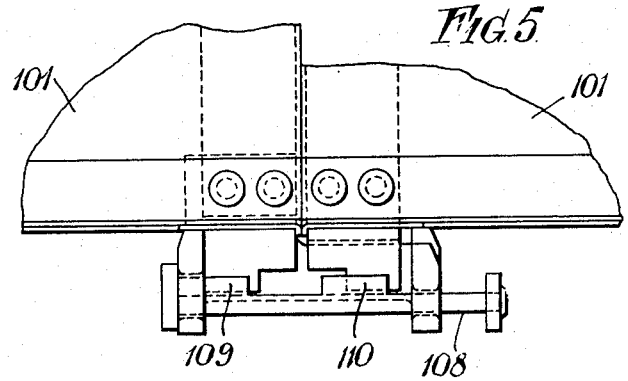
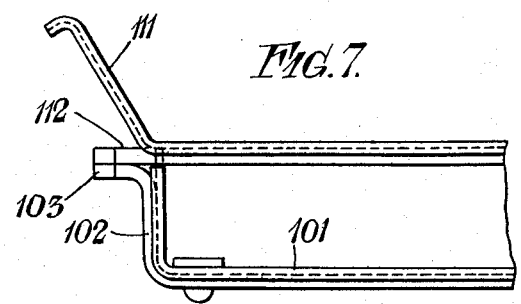
Angus W. Duncan March 31, 1953 A. W. DUNCAN 2,633,230
SCRAPER CHAIN CONVEYER
Filed Nov. 9, 1950 3 Sheets-Sheet 3
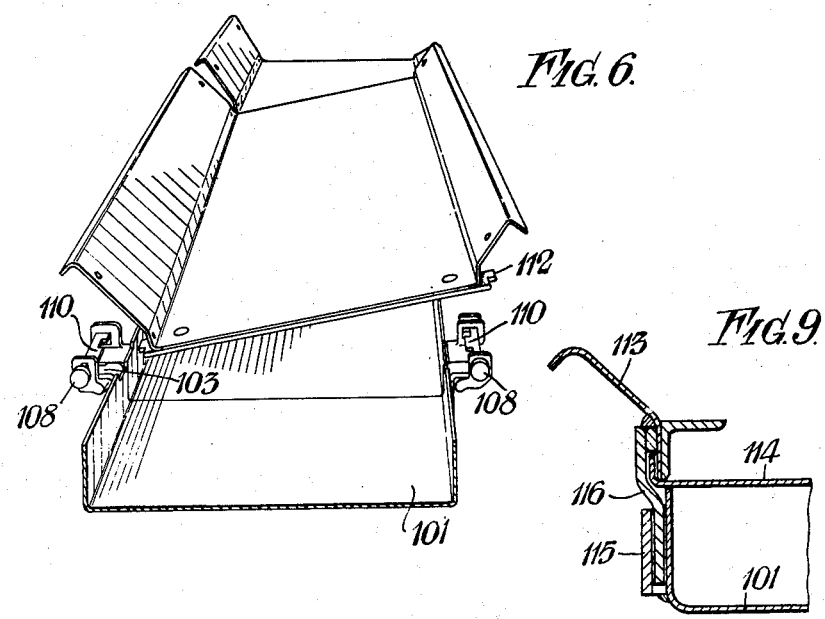
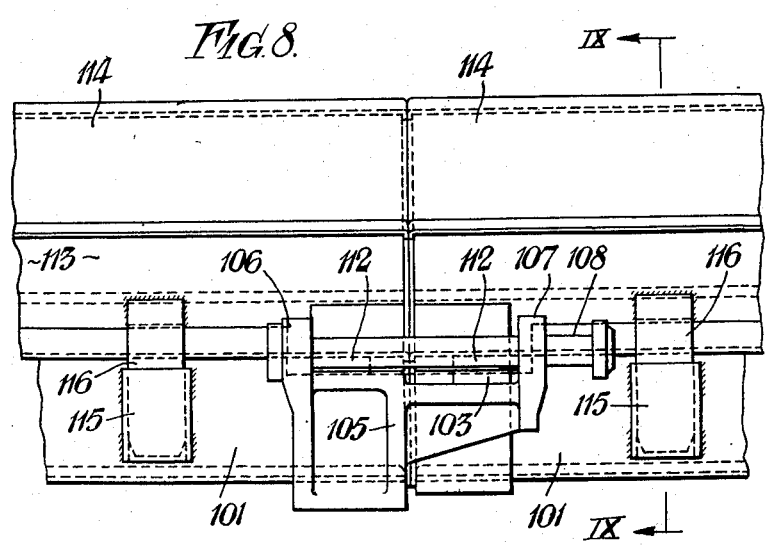
Inventor
Angus W. Duncan Patented Mar. 31, 1953

2,633,230

UNITED STATES PATENT OFFICE 2,633,230

SCRAPER CHAIN CONVEYER

Angus W. Duncan, Worcester, England, assignor to The Mining Engineering Company Limited, Worcester, England Application November 9, 1950, Serial No. 194,768
In Great Britain November 14, 1949

9 Claims. (Cl. 198—204)

This invention relates to scraper chain conveyor structures of the type used for the transport of coal and other minerals at the working face underground.

It is an object of the present invention to provide scraper chain conveyor structures having separable upper and lower pan sections with means for readily connecting adjacent sections together.

According to the invention, from one aspect, a scraper chain conveyor structure having separable upper and lower pan sections is provided with readily releasable, axially movable, locking members which both secure the upper to the lower pan sections and also hold adjacent lower pan sections in substantial alignment with one another.

From another aspect, the invention provides scraper chain conveyor structures in which locking members in the form of stepped keys are movable axially to release upper pan sections from lower pan sections and the lower pan sections from each other for removal of any one section from between adjacent sections.

From yet another aspect the invention provides improved connecting means for the interconnection of scraper chain conveyor structures having separable top and bottom pan sections comprised by axially movable stepped keys having portions of reduced cross-section and slidable in housings to lock or release lugs projecting from adjacent longitudinally aligned pans.

The above and other parts of the invention are embodied in forms of scraper chain conveyor structures and connecting means therefor which will now be described in some detail by way of example with reference to the accompanying drawings in which:

Fig. 1 is a transverse vertical section through the connection of two adjacent trapped scraper chain conveyor sections, Fig. 2 is a section on the line II—II of Fig. 1, Fig. 3 is a vertical transverse section on the line III—III of Fig. 2, Fig. 4 is a side elevation of adjacent untrapped scraper chain conveyor sections and their connecting means in locked position, Fig. 5 is a plan view of the connecting means shown in Fig. 4 with the top pans of the sections removed, Fig. 6 is a perspective view showing a top pan tilted for removal, Fig. 7 is a half end view in the direction of the arrows VII—VII of Fig. 4, Fig. 8 is a side elevation of a different form of adjacent trapped scraper chain conveyor sections having removable face side plates on the top pans, Fig. 9 is a part section on the line IX—IX of Fig. 8.

The structure shown in Figs. 1 to 3 comprises a lower trough section 101 of simple rectangular form and an upper trough section made up from two members 102 and 103. The member 102 is of trough form having a short vertical and outwardly flared side portion 102a and a horizontal portion extending across the top of the lower trough 101 and terminating in a short upturned vertical flange 102b. A short horizontal flange 104 extends inwardly from the side member to enclose and trap one of the side chains of the scraper chain. The other member 103 is similar in form to the side portion 102a of the first member 102 and also has a short horizontal flange 105 projecting inwardly to trap the other side chain of the scraper chain.

It will be understood that, when assembled together, a complete trough with outwardly flared sides is formed.

The ends of the upper and lower trough sections are arranged in any convenient manner to fit into each other so that a continuous smooth path is provided for both runs of the scraper chain.

On either side of the one end of the lower trough section angle cleats 106 have ring portions 106a that carry tubular members 107 which project through clearance holes in similar ring portions 108a of angle cleats 108 on the end of the mating trough section. Slots 109 are cut in the tube 107 on the side facing the trough so arranged that pockets are formed between the tube and the angle cleats 106 and 108 to receive vertically projecting lugs 110 fixed to the upper trough members 102 and 103. It will be understood that the insertion of the lugs 110 in the slots 109 at the outer ends of the tubular members forces the angle cleats 106 and 108 and thus the trough sections 101 together and locks them. The lugs in the slots at the inner ends of the tubes only support and locate the upper trough assembly.

Passing through each tubular member 107 is a locking bar 111 slightly longer than the tube and having end portions of greater diameter than the bore of the tube so that it is captive but has limited axial freedom of movement relative to the tube. In one extreme position turned down portions 111a of the locking bar are opposite the slots in the tube and in the other extreme position full diameter portions 111b of the locking bar move into the slot positions and thus into grooves 112 formed in the lugs attached to the upper trough assembly.

It will be understood that the locking bar is moved to the "open" position when the lugs are to be inserted in the slots and then moved over into the "locked" position for running to prevent any lifting of the scraper chain from lifting the upper trough assembly out of position.

The scraper chain comprises two side chains of any convenient type having scraper bars fixed between them at intervals.

To assemble the conveyor the lower troughs 101 are laid in position with the angle cleats 106, 108 abutting and the tubular members 107 acting as dowels to assure approximate vertical alignment. The lower strand of scraper chain 114 is laid in position in the lower troughs and coupled up. The locking bar members 111 along one side are moved into the open position and the main member 102 of the upper trough sections fitted by dropping the lugs 110 into the slots 109 formed between the tubular members 107 and their associated angle cleats. The locking bar members are then moved over by hand or hammer into the locked position. The upper strand of scraper chain 114 is then laid in the upper trough, laterally slightly out of line, coupled up and slid sideways into its working position. The other parts 103 of the upper trough sections are then fitted and the associated locking bars moved over into locked position.

Dismantling is simply a reversal of the assembly process.

It will be understood that the scraper chain cannot lift out of its working position within the structure even when the conveyor is laid in a hollow, yet dismantling is simple and rapid and is accomplished without tools other than a hammer.

The form of conveyor structure illustrated in Figs. 4 to 7 is adapted for top pans in which the top pan does not trap the scraper chain and includes modified locking means.

At one end of each bottom pan 101' a strap 108' passes under the pan then upwardly and has substantially horizontal projecting lugs 108a' of less width than the strap (Fig. 5). The thin metal of the pan may be bent down over the edge of the strap to present a smooth face to the scraper chain.

At the other end of the pan a strap 106' of substantially heavier section passes under the pan and is turned upwardly. Welded to the vertical portions of the strap are steel castings 107', each having an open recess or U portion 109' defined between lugs 107a', 107b'. The recess, where the casting extends beyond the end of the pan is deeper by the thickness of the projecting lug 108a' on the end of the mating bottom pan. A sliding bolt 111' conveniently of L section, is captive within lugs 107a', 107b' on the castings, the horizontal flange of the bolt 111' being cut away at 111a' opposite the recess or U portions of the casting in the "open" position and leaving locking portions 111b' which project over them in the "locked" position (Fig. 5). The top pan 102' has flat members 110' attached to the ends of its bottom plate, these flat members projecting and being cut away for a proportion of their width on the side remote from the pan. The thin metal of the pan pressing may be bent down over the edge of the flat members. To assemble, the mating bottom pan is dropped into position so that the projecting lugs 112' rest in the bottom of the deeper recessed part between the lugs 107a', 107b', the bolt 111' being in the "open" position. This ensures alignment between the bottom pans in the horizontal plane. The top pans 102' are then dropped into place, the lugs 112' dropping into the more shallowly recessed portions of the castings. The sliding bolts 111' are then moved longitudinally into the "locked" position (as shown in Figs. 4 and 5) the projecting horizontal flanges 111b' moving over the lugs 112' attached to the top pans 102', locking them in position and thus also locking the bottom pans in vertical alignment.

Heavy bevels on the leading edges of the top pan lugs 112' and on the leading edges of the bolt projecting flanges 111a' may be provided to ensure that the various components of the joint are forced into position as the bolt 111' is moved across to locking position. To dismantle, the bolts 111' are slid to the open position (to the left in Figs. 4 and 5) when the top pans 102' can be lifted out and the bottom pans disconnected immediately at any point in the conveyor run.

Alternatively, the bolts on one side only of the conveyor run are slid into the open position as shown in Fig. 6 when that side of any top pan can be lifted clear of the cast or stamped member and the pan slid sideways until the opposite side disengages when the top pan is lifted out in the normal way.

Where trapped chain structure is employed as shown in Figs. 8 and 9 in which the top pan comprises two or more components, such as the removable face side plate 103a and main pan structure 102a, pockets 115 attached to the bottom pan 101a receive pegs 116 attached to the side components of the top pan in addition to the lugs 112' described above for aligning and locking the section. The purpose of the pegs and pockets is simply to give stability in the vertical plane to the components of the top pan.

It will be noted that the improved apparatus enables any top pan anywhere in the conveyor to be removed or replaced, that the connection between pans can be made or broken with no tool other than a hammer, that both bottom and top pans will be maintained in fairly close alignment so that a reasonably continuous path for the chain shall be formed, that the top and bottom pans will be locked positively together so that the under side of the top pans can hold down the bottom chain in undulated settings.

It will also be noted that the form of locking means illustrated in Figs. 4 to 9 of the drawings permits the withdrawal of any bottom pan in the conveyor run.

Obviously the invention includes the functional equivalents of the specific structures embodied in the preferred form described.

I claim:

1. In a scraper chain conveyor having separable upper and lower pan sections, a pair of locking devices carried by one of each adjacent pair of sections, locking means on the other adjacent sections, each locking device comprising a housing attached adjacent the end of a pan section and interfitting with said locking means, and a locking member captive within the housing and operable by a simple axial movement to trap said locking means and secure the adjacent upper pan sections to the lower pan sections and to hold adjacent lower pan sections in substantial alignment to one another.

2. In a scraper chain conveyor having separable upper and lower pan sections, lugs projecting from adjacent the ends of each upper pan section, lugs projecting from adjacent one end of each lower pan section, and locking means carried at both sides of the other end of each lower pan section, such locking means comprising a housing attached to and projecting from the end of the lower pan section and providing a recess for the reception of said lugs, and a locking member captive within the housing and operable by a simple axial movement to secure the adjacent upper pan sections to the lower pan sections and to hold adjacent lower pan sections in substantial alignment to one another.

3. Apparatus as defined in claim 1 in which the locking members comprise stepped keys longitudinally movable in housings carried by the lower pan sections, the movement being substantially parallel to the run of the conveyor.

4. Apparatus as defined in claim 1 in which the locking members comprise stepped keys longitudinally movable in housings carried by the lower pan sections and are longer than said housings and extend from one end or the other of the housings so that they can be longitudinally moved by end pressure.

5. Apparatus as defined in claim 2 wherein the locking members lie within the width of the upper pan sections and move longitudinally substantially parallel to the run of the conveyor.

6. Apparatus as defined in claim 2 wherein the upper pan sections are secured by members extending laterally in substantially horizontal directions, whereby release of the locking means at one side of the conveyor permits withdrawal of an upper pan section from the locking means on the other side of the conveyor.

7. Apparatus according to claim 2 in which the locking members comprise stepped members of L-section longitudinally movable in housings carried by the lower pan sections and are longer than said housings and extend from one end or the other of the housings so that they can be longitudinally moved by end pressure.

8. Apparatus according to claim 2 in which the locking members comprise stepped cylindrical rods movable in tubular housings carried by the lower pan sections and are longer than said housings and extend from one end or the other of the housings so that they can be longitudinally moved by end pressure.

9. Apparatus as defined by claim 2 wherein said upper pan sections have laterally disposed channel-like pockets for trapping the conveyor chains.

ANGUS W. DUNCAN.

REFERENCES CITED

The following references are of record in the file of this patent:

UNITED STATES PATENTS

| Number | Name | Date |
|---|---|---|
| 1,877,863 | Hatt et al. | Sept. 20, 1932 |
| 2,491,405 | Wood | Dec. 13, 1949 |

FOREIGN PATENTS

| Number | Country | Date |
|---|---|---|
| 109,221 | Austria | Apr. 10, 1928 |
| 635,175 | Germany | Sept. 11, 1936 |